(12) United States Patent
Bhatia et al.

(10) Patent No.: US 12,170,603 B2
(45) Date of Patent: Dec. 17, 2024

(54) SAMPLED PACKET INFORMATION ACCUMULATION

(71) Applicant: Arista Networks, Inc., Santa Clara, CA (US)

(72) Inventors: Navdeep Bhatia, Sunnyvale, CA (US); Hugh Holbrook, Palo Alto, CA (US); Michael Chih-Yen Wang, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/170,020

(22) Filed: Feb. 16, 2023

(65) Prior Publication Data

US 2024/0283724 A1 Aug. 22, 2024

(51) Int. Cl.
*H04L 43/106* (2022.01)
*H04L 43/062* (2022.01)
*H04L 43/0894* (2022.01)

(52) U.S. Cl.
CPC ........ *H04L 43/0894* (2013.01); *H04L 43/062* (2013.01); *H04L 43/106* (2013.01)

(58) Field of Classification Search
CPC .. H04L 43/0894; H04L 43/062; H04L 43/106
See application file for complete search history.

(56) References Cited

U.S. PATENT DOCUMENTS

| | | | |
|---|---|---|---|
| 6,473,400 B1 | 10/2002 | Manning | |
| 6,473,435 B1 | 10/2002 | Zhou et al. | |
| 6,721,334 B1 | 4/2004 | Ketcham | |
| 7,096,272 B1 | 8/2006 | Raman | |
| 7,106,738 B2 | 9/2006 | Saidi et al. | |
| 7,715,419 B2 | 5/2010 | Tatar et al. | |
| 8,793,358 B1 | 7/2014 | Godbole et al. | |

(Continued)

FOREIGN PATENT DOCUMENTS

EP 1159813 B1 4/2005

OTHER PUBLICATIONS

Shie-Yuan Wang et al., High-speed data-plane packet aggregation and disaggregation by P4 switches, Journal of Network and Computer Applications, May 17, 2019, pp. 98-110, Elsevier Ltd.

(Continued)

*Primary Examiner* — John B Walsh
*Assistant Examiner* — Steven C Nguyen
(74) *Attorney, Agent, or Firm* — Treyz Law Group, P.C.; Tianyi He

(57) ABSTRACT

A network device may include a packet processing pipeline. The packet processing pipeline may include a parser configured to parse packet information in a transit packet received at an input interface of the network device. The packet processing pipeline may include packet sampling information storage circuitry configured to store sampled packet information obtained based on the parsed packet information. The packet processing pipeline may include a processing engine configured to modify a payload of a sampling information accumulation packet to include the sampled packet information for the transit packet. The payload of the sampling information accumulation packet may include the sampled packet information for multiple transit packets.

20 Claims, 6 Drawing Sheets

(56) References Cited

U.S. PATENT DOCUMENTS

| | | |
|---|---|---|
| 9,203,763 B2 | 12/2015 | Anand et al. |
| 9,906,460 B2 | 2/2018 | Bhatia et al. |
| 10,038,637 B2 | 7/2018 | Shelar et al. |
| 2006/0248374 A1 | 11/2006 | MacAdam et al. |
| 2007/0165625 A1* | 7/2007 | Eisner .................. H04L 67/561 370/389 |
| 2007/0195777 A1* | 8/2007 | Tatar .................. H04L 49/1546 370/469 |
| 2015/0078159 A1* | 3/2015 | Anand .................... H04L 47/22 370/230.1 |
| 2018/0012633 A1* | 1/2018 | Holbrook .............. H04L 43/062 |
| 2018/0159750 A1* | 6/2018 | Alcala ................. H04L 12/5602 |
| 2018/0302308 A1* | 10/2018 | O'Brien .................. H04L 43/10 |
| 2019/0058641 A1* | 2/2019 | Mirzazad Barijough .................... H04L 43/026 |

OTHER PUBLICATIONS

Antoine Kaufmann et al., High Performance Packet Processing with FlexNIC, Apr. 2-6, 2016, pp. 67-81, ASPLOS, Atlanta, Georgia.
Theo Jepsen et al., Forwarding and Routing with Packet Subscriptions, Dec. 1-4, 2020, CoNEXT, Barcelona, Spain.
Shie-Yuan Wang et al., Aggregating and disaggregating packets with various sizes of payload in P4 switches at 100 Gbps line rate, Journal of Network and Computer Applications, May 19, 2020, pp. 1-15, Elsevier Ltd.

* cited by examiner

SAMPLED PACKET INFORMATION ACCUMULATION

BACKGROUND

A communication system includes multiple network devices that are interconnected to form a network for conveying packets from source devices to destination devices. To assist in gathering network performance metrics, some of these packets and/or information associated with these packets can be sampled by the network devices for analysis.

DETAILED DESCRIPTION

A network device can sample transit packets to obtain packet information for gathering network performance metrics. Sampling transit packets received at the packet processor can often involve the control plane processor. This can be inefficient since the packet sampling rate will be limited by the processing rate of the control plane processor and of the communications path between the packet processor and the control plane processor.

To reduce the involvement of the control plane processor and thereby increase the packet sampling rate, the packet processor may implement one or more data storage structures used to enqueue and dequeue sampled packet information. The sampled packet information may be sequentially and cumulatively inserted into a recirculated information accumulation packet. The information accumulation packet can include packet information from multiple batches of transit packets. Information accumulation packets can be periodically transmitted from the packet processor to a collector system for subsequent analysis (e.g., to generate corresponding network performance metrics). The sampling of packet information and the insertion of the sampled packet information into an information accumulation packet may be performed at the same or different processors in the network device. Configurations in which the packet processor performs both the sampling of packet information and the insertion of sampled packet information into an information accumulation packet at the packet processor are described herein as an illustrative example. If desired, the packet processor may perform the sampling of packet information and transmit the sampled packet information to another processor such as the control plane processor, while the other processor may process the received sampled packet information and transmit the received packet information (e.g., accumulated within an information accumulation packet).

Figure 1:
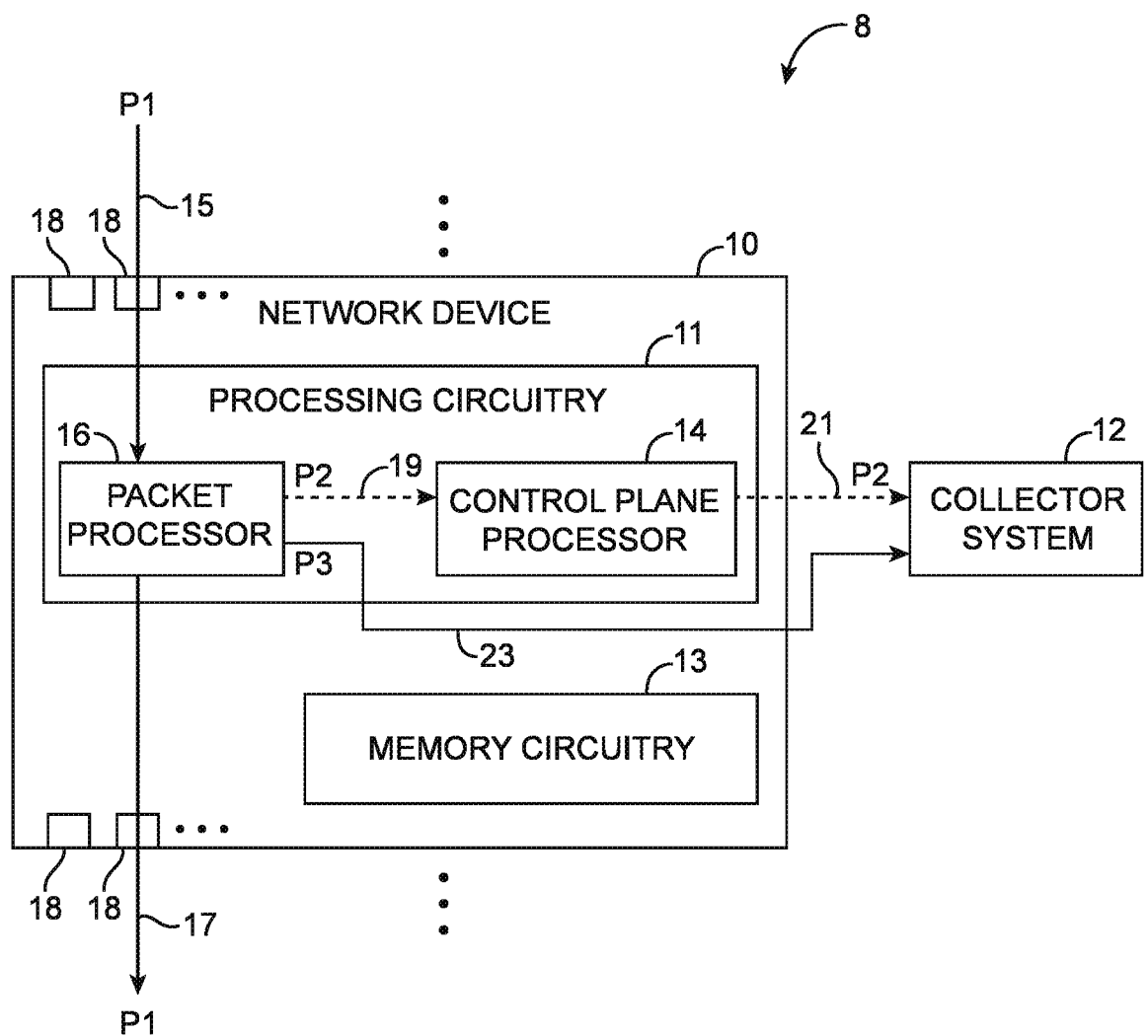
FIG. 1 is a diagram of an illustrative network device configured to provide sampled packet information to a collector system in accordance with some embodiments.

FIG. 1 is a diagram of a network device such as network device 10 that is configured to perform transit packet sampling using information accumulation packets. Network device 10 may be a switch, a router, a bridge, a hub, a repeater, a firewall, a device serving other networking functions, a device that includes a combination of these functions, or other types of network elements. Multiple such network devices 10 may be present and interconnected within networking system 8. Transit packets such as packet P1 may traverse one or more network devices 10 as they are conveyed between source devices and destination devices. Transit packets for a particular network device 10 as described herein generally refer to packets that are conveyed within the network containing the particular network device 10. These transit packets may originate from outside of the network device 10 and may be forwarded from an ingress interface of the network device 10 to an egress interface of the network device 10. Transit packets as described herein are not limited to user and/or application data packets that are conveyed between end host devices, but may also include packets that originate from and/or are destined for network devices (e.g., switches, routers, etc.), packets that convey acknowledgment, error, control, and/or routing information, any other types of packets that transit the network containing network device 10.

Networking system 8 may include a large number of network devices 10 that process a large number of transit packets. To provide visibility into the workings of these numerous network devices 10 and ensure that the large number of transit packets are being desirably conveyed across the network using network devices 10, and/or for other illustrative reasons, one or more network devices 10 may sample at least some transit packets and convey the sampled packet information (e.g., information in and/or associated with the sampled packet) to a collector system such as collector system 12. Collector system 12 may sometimes be referred to simply as collector 12 or packet (information) collector 12, or as collector circuitry 12 when implemented as part of a larger control, management, and/or analysis system. Collector system 12 may collect and aggregate sampled packet information from multiple network devices 10 each configured in the manner described in connection with FIG. 1 or configured in other manners.

Collector system 12 may organize, parse, perform calculations and/or other processing operations, perform analysis, and/or otherwise operate on the sampled packet information being collected. In particular, collector system 12 may include processing circuitry based on one or more microprocessors, graphics processing units (GPUs), host processors, general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors, and may include memory circuitry such as nonvolatile memory (e.g., flash memory or other electrically-programmable read-only memory configured to form a solid-state drive), volatile memory (e.g., static or dynamic random-access memory), hard disk drive storage, and/or other storage circuitry. The collector system 12 may perform, using its processing circuitry and memory circuitry, the above-mentioned operations on the sampled packet information.

In some configurations, collector system 12 may be implemented as part of a network device controller external to network device 10 that controls the operation of network devices 10 (e.g., by providing policy information and/or other configuration or control data to network devices 10). In other configurations, collector system 12 may be implemented separately from the network device controller but still remain external to network device 10. While FIG. 1 shows collector system 12 separately from network device 10, in yet other configurations, collector system 12 may include components on network device 10 and/or may be formed on network device 10 (e.g., formed as part of the control plane of network device 10 or implemented using part of control plane processor 14).

If desired, collector system 12 may be configured to further forward the received sampled packets and/or sampled packet information regarding the sampled packets to other downstream network devices 10 for further processing and/or for output (e.g., analysis devices, service devices, input-output devices, etc.). If desired, multiple collector circuitry in collector system 12 may be distributed across the network (e.g., across multiple network devices 10). If desired, each of the multiple collector circuitry may include corresponding processing circuitry and memory circuitry implemented on separate computing equipment.

As shown in FIG. 1, network device 10 may include processing circuitry 11 and memory circuitry 13. Processing circuitry 11 may include one or more processors or processing units based on microprocessors on general-purpose processors, microcontrollers, digital signal processors, programmable logic devices such as a field programmable gate array device (FPGA), application specific system processors (ASSPs), application specific integrated circuit (ASIC) processors, etc. Memory circuitry 13 may include volatile memory such as dynamic random-access memory, static random-access memory, etc., and non-volatile memory such as hard-drive storage, solid-state storage, flash memory, etc.

In general, the operations described herein relating to the packet forwarding operation of transit packets, the transit packet sampling operation using information accumulation packets and/or other relevant operations may be stored as (software) instructions on one or more non-transitory computer-readable storage media (e.g., memory circuitry 13) in network device 10. The corresponding processing circuitry (e.g., processing circuitry 11) in network device 10 for these one or more non-transitory computer-readable storage media may process or execute the respective instructions to perform these corresponding operations.

Configuration in which processing circuitry 11 includes two functionally distinct processors (e.g., two functionally distinct portions of processing circuitry 11) are sometimes described herein as an illustrative example. In this example, processing circuitry 11 may include a control plane processor 14 and a packet processor 16. In general, control plane processor 14 and packet processor 16 may each be based on one or more microprocessors, graphics processing units (GPUs), host processors, general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors. Control plane processor 14 and packet processor 16 may each include and/or operate in conjunction with shared or separate portions of memory circuitry 13.

In some illustrative arrangements described herein as an illustrative example, packet processor 16 may be implemented using one or more integrated circuits such as dedicated high-speed switch circuits (e.g., ASICs) and may serve as a hardware data path. Control plane processor 14 may be implemented using a central processing unit (CPU) may run control software (e.g., stored on corresponding memory circuitry operating in conjunction with control plane processor 14) such as packet processing software, may be used to support the operation of (protocol) clients, may be used to support the operation of packet processor 16, and/or may store packet forwarding information. If desired, packet processing software running on control plane processor 14 may be used in implementing a software data path.

As an example, one or more (protocol) clients running on control plane processor 14 may receive data that determines, based on a corresponding protocol, how network device 10 is to process incoming packets between input-output interfaces (e.g., ports 18 on network device 10). With one suitable arrangement, packet forwarding information may be received and stored as packet forwarding decision data (sometimes referred to herein as packet processing decision data) at packet processor 16 (e.g., on a portion of memory circuitry 13 integrated as part of or separate from packet processor 16). In particular, the memory circuitry for packet processor 16 may include arrays of memory elements storing packet forwarding decision data (e.g., entries in a general matching table usable as a forwarding table for forwarding packets through the network, a routing table for routing functions, a switching table for switching functions, a sampling table for sampling functions etc., and implementable as a content addressable memory (CAM) table implemented on CAM circuitry, a ternary CAM (TCAM) table implemented on TCAM circuitry, etc.). In other words, the memory circuitry for packet processor 16 storing the entries of the packet forwarding decision data may be used in implementing a matching engine in packet processor 16.

If desired, control plane processor 14 may store a corresponding version of the packet processing decision data as cache storage. This is, however, merely illustrative. The memory elements at packet processor 16 storing packet processing decision data may serve as the exclusive storage for packet processing decision data entries in network device 10 or may be omitted in favor of packet processing decision data storage resources within control plane processor 14. Packet processing decision data entries may be stored using any suitable data structures or constructs (e.g., one or more tables, lists, etc.). In order to not unnecessarily obscure the present embodiments, packet processing decision data (e.g., whether maintained in a database in control plane processor 14, stored within an array of memory elements of packet processor 16, or generally stored in any type of memory, and whether used for forwarding, routing, switching, or sampling packets) are sometimes described herein as being implemented using one or more matching tables having corresponding entries.

Packet processor 16 may include one or more packet processing engines each used to implement a corresponding packet processing pipeline configured by configuration data such as the packet processing decision data to perform any suitable type of processing (e.g., associated with any corresponding networking protocol, and using the corresponding header fields associated with the networking protocol) to assist network device 10 in making forwarding decisions of network packets. Configurations in which network devices store matching tables usable in making switching, routing, and generally forwarding decisions are described herein as illustrative examples. The principles of the embodiments described herein may similarly be implemented in network devices of other types storing packet processing decision data in other manners.

Network device 10 may include input-output components such as ports 18. As examples, input-output components may include communication interface components such as a Bluetooth® interface, a Wi-Fi® interface, an Ethernet interface (e.g., one or more Ethernet ports), an optical interface, and/or other networking interfaces for connecting device 10 to the Internet, a local area network, a wide area network, a mobile network, other types of networks, and/or to another network device, peripheral devices, and/or other electronic components. If desired, network device 10 may include other components such as a system bus that couples the components of network device 10 to one another, power management components, etc.

In the example of FIG. 1, network device 10 is configured to receive transit packet P1. Packet processor 16 (e.g., one or more packet processing pipeline in packet processor 16 such as an ingress processing pipeline and/or an egress processing pipeline) may forward packets such as transit packet P1 from an ingress interface 15 (e.g., one of ports 18) to an egress interface 17 (e.g., the same one or a different one of ports 18). If desired, in addition to performing forwarding, the one or more packet processing pipelines may also modify, copy, and/or may perform other suitable actions on incoming transit packets such as packet P1.

As illustrated in FIG. 1, in addition to forwarding transit packet P1 to egress interface 17, packet processor 16 (e.g., one or more packet processing pipeline in packet processor 16) may also sample transit packet P1 to collect transit packet information for collector system 12.

In some instances, the sampling of packet P1 may involve generating a packet such as packet P2, which can be a copy of packet P1 or a packet containing only some of the information (e.g., header information) of packet P1. Packet processor 16 may forward packet P2 to control plane processor 14 via path 19. As an example, path 19 may include a Peripheral Component Interconnect Express (PCIe) interface or other processor-to processor computer bus interface. Control plane processor 14 may optionally modify packet P2 before forwarding packet P2 to collector system 12 via path 21. As examples, path 21 may include an egress interface (e.g., one of ports 18) of network device 10, a network path through one or more network devices 10, a control path coupled to a network device controller containing collector circuitry, etc.

However, sampling transit packets in this manner can be undesirable as this sampling scheme requires the use of intervening path 19 and control plane processor 14, which can limit the packet sampling rate. This limitation can be due to the limited processing rate of control plane processor 14 relative to packet processor 16, which may be more specialized for performing packet processing/forwarding. In other words, control plane processor 14 may create a bottleneck for the packet sampling process.

To improve the packet sampling rate, packet processor 16 may be configured to generate packets such as packet P3 containing packet information of and/or associated with packet P1 and output packet P3 directly to collector system 12 via path 23 (e.g., without needing to perform packet processing at control plane processor 14). As examples, path 23 may include an egress interface (e.g., one of ports 18) of network device 10, a network path through one or more network devices 10, a control path coupled to a network device controller containing collector circuitry and/or other paths internal to and/or external to network device 10. If desired, packet P3 containing packet sampling information may be transmitted to collector system 12 via tunneling (e.g., using a Virtual Extensible LAN (VxLAN) tunnel, using a Generic Routing Encapsulation (GRE) tunnel, using an IP in IP tunnel, etc.). In some illustrative configurations in which collector circuitry 12 is implemented on control plane processor 14 or generally within network device 10, path 23 connecting packet processor 16 and collector system 12 may be implemented using portions of the data plane (paths) within network device 10 and/or may be implemented using portions of the control plane (paths) within network device 10.

To further improve the packet sampling rate, packet processor 16 may insert packet information of and/or associated with multiple packets within each packet P3 before outputting packet P3 to collector system 12. In other words, packet P3 may contain packet information of and/or associated with packet P1 and packet information of and/or associated with one or more additional transit packets. Illustrative configurations of packet processor 16 and network device 10 that enable this packet sampling scheme are further detailed below (e.g., in connection with FIGS. 2-7).

Figure 2:
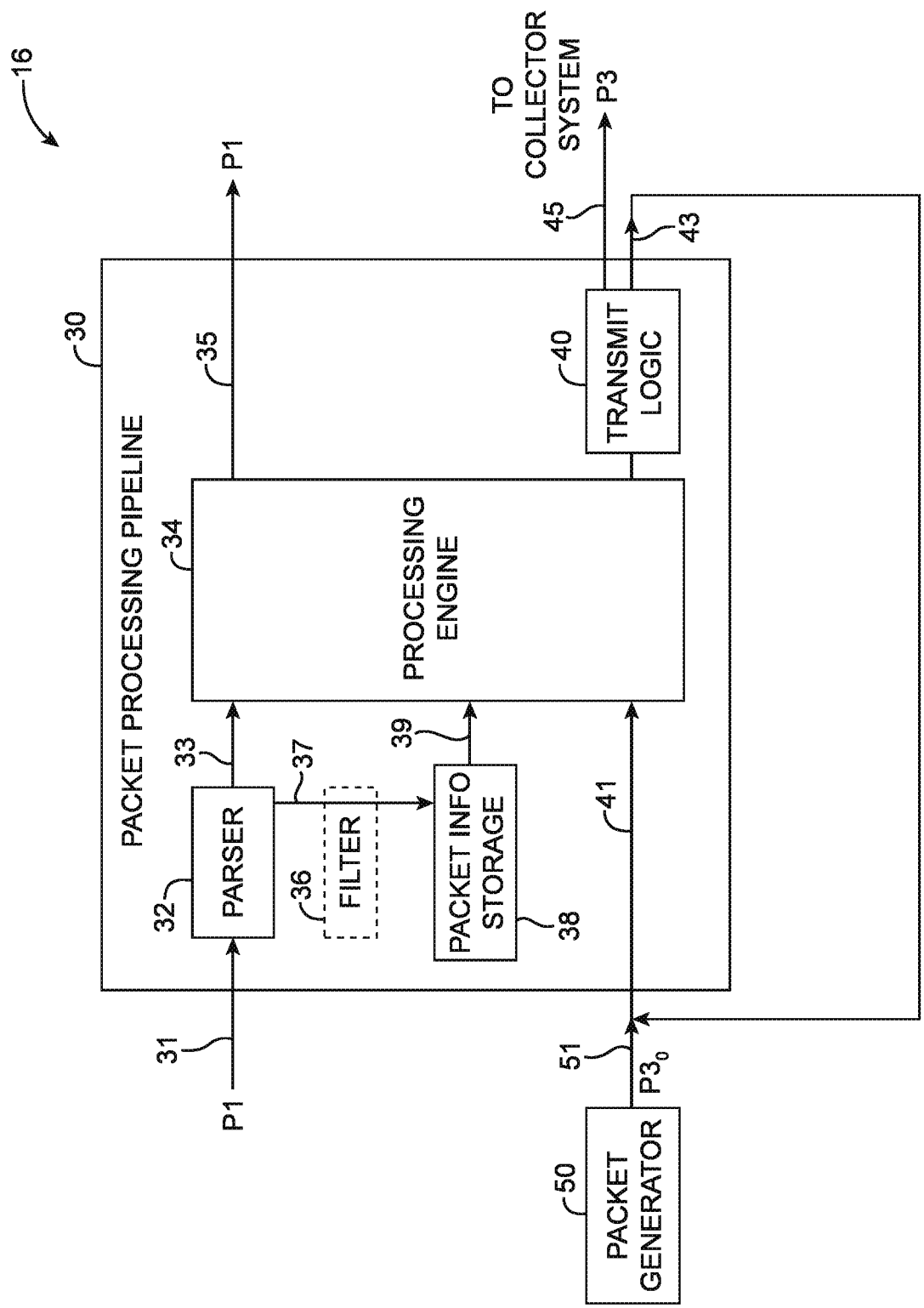
FIG. 2 is a diagram of an illustrative packet processor having a packet processing pipeline configured to store sampled packet information and transmit an information accumulation packet inserted with the information in accordance with some embodiments.

FIG. 2 is a diagram of an illustrative packet processor such as packet processor 16 in network device 10 of the type in FIG. 1. As shown in FIG. 2, packet processor 16 may include a packet processing pipeline 30 (e.g., one of many packet processing pipelines in packet processor 16). Packet processing pipeline 30 may be an ingress pipeline or an egress pipeline.

Configurations in which processing pipeline 30 is an ingress pipeline are sometimes described herein as an illustrative example. Processing pipeline 30 may include a parser such as parser 32 and a processing engine such as processing engine 34 configured to modify information on packets. Processing pipeline 30 may include other components such as a selector that appropriately forwards the (intermediate) packet output from processing pipeline 30 to an egress pipeline via output interface 35, etc. Packet processor 16 may receive transit packet P1 at an input interface 31 of processing pipeline 30 (e.g., an input-output port 18 of network device 10).

In this example, processing pipeline 30 may be an ingress pipeline associated with the input interface 31 (e.g., configured to handle ingress packets received at the input-output port 18 of network device 10). Parser 32 may parse packet P1 to access parts of packet P1 (e.g., header information). As part of the forwarding operation of packet P1, the parsed information may be used as search/lookup keys into (ingress) data tables to enable the performance of appropriate operations at processing pipeline 30. As examples, the appropriate operations may include generating metadata indicative of an egress pipeline to which the packet should be directed to or other packet metadata (e.g., to bridge or route the packet, to add a tunnel header or not, etc.), obtaining editing instructions that feed into processing engine 34 to direct editing actions on the packet, and/or other operations. In order to not unnecessarily obscure the present embodiments, transit packet P1 as shown in the example of FIG. 2 may remain unchanged when output from output interface 35.

In configurations in which processing pipeline 30 is an egress pipeline, packet P1 may be received as an intermediate packet from a preceding ingress pipeline and may be output to an egress interface (e.g., egressed from an input-output port 18 of network device 10). The same type of processing of packet P1 (e.g., using a parser to obtain parsed information, using the parsed information for search/lookup, using processing engine 34 to optionally edit packet P1, etc.) as described above in connection with processing pipeline 30 being an ingress pipeline may still be performed.

Regardless of whether processing pipeline 30 is an ingress pipeline, an egress pipeline, or a processing pipeline of another type (e.g., a processing pipeline dedicated for transit packet sampling), processing pipeline 30 may be configured to perform packet sampling operation. As shown in FIG. 2, processing pipeline 30 may further include and/or implement data storage circuitry 38 (sometimes referred to herein as sampled packet information storage circuitry 38) containing one or more data storage structures. Data storage circuitry 38 may include one or more first-in-first out storage circuits, one or more linked lists, and/or one or more of other types of data storage structures such as other data storage structures that enable enqueuing and dequeuing operations.

In addition to parsing transit packets such as packet P1 to obtain parsed information to perform transit packet editing and forwarding operations, parser 32 may also obtain (the same or different) parsed information for packet sampling operations. In particular, parser 32 may identify at least some of the parsed information for sampling (e.g., based on a sampling policy, based on a parse graph, etc.). The parsed information for packet sampling operations may be provided to (e.g., enqueued onto) sampled packet information storage circuitry 38 for temporary storage via path 37. An intervening filter such as filter 36 may optionally receive the parsed information from parser 32 before data storage circuitry 38. Filter 36 may preferentially select types of packets (e.g., types of network traffic flows to be sampled) for which packet information is stored, types of sampling (e.g., pseudo-random sampling of transit packets, sampling during certain time periods, etc.), types of packet information (e.g., types of header information, packet timestamp information, etc.) to sample and store, and/or other characteristics for the packet sampling, before the desired set of packet information is enqueued onto data storage circuitry 38 for storage. If desired, filter 36 may be implemented by performing search, lookup, and/or matching operations using the parsed information as keys and/or may be implemented using hardware filtering circuitry.

As examples, the sampled packet information stored at data storage circuitry 38 may include packet header information of the packet such as source Internet Protocol (IP) address, destination IP address, source Media Access Control (MAC) address, destination MAC address, ethernet type, protocol, and other packet header information, may include non-header information packet timestamp information such as a timestamp indicative when the packet was received at the network device, packet count information such as a packet count indicative of a number of packets in the same network flow received by the network device, and/or other types of information associated with the packet.

To capture the sampled packet information stored on data storage circuitry 38, packet processor 16 may be configured to provide (e.g., received and/or generate) an information accumulation packet (sometimes referred to herein as a sampled packet information accumulation packet or a sampling information accumulation packet). The information accumulation packet may be received at input interface 41 (e.g., an internal interface of processing pipeline 30 or of packet processor 16, an external ingress interface of network device 10, etc.). Sampled packet information stored at data storage circuitry 38 may be inserted into the information accumulation packet by processing engine 34. As an example, processing engine 34 may receive the dequeued packet information from data storage circuitry 38 via path 39 and may insert the corresponding dequeued packet information into the information accumulation packet received at input interface 41.

While the same processing engine 34 for the same processing pipeline 30 is shown in the example of FIG. 2 to operate on both the transit packet (e.g., to forward and/or edit the transit packet) and the sampled packet information accumulation packet (e.g., to forward and/or edit the sampled packet information accumulation packet), this example is merely illustrative. If desired, two different processing engines 34 (e.g., in different pipelines 30) may be used to operate on the transit packet and on the sampled packet information accumulation packet, respectively. The two different processing engines 34 may still share access to the same sampled packet information storage circuitry 38 (e.g., one processing engine/pipeline enqueues sampled packet information from processed transit packets and the other engine/pipeline receives dequeued sampled packet information for insertion into sampled packet information accumulation packets).

In general, the process of inserting or enqueuing packet information into data storage circuitry 38 may occur independently from the process of dequeuing or output packet information from data storage circuitry 38. In other words, packet information for transit packets may be enqueued onto data storage circuitry 38 as they are received at interface 31 and processed by parser 32, while the stored packet information may be dequeued and inserted into sampled packet information accumulation packets as they are received at interface 41.

Figure 3:
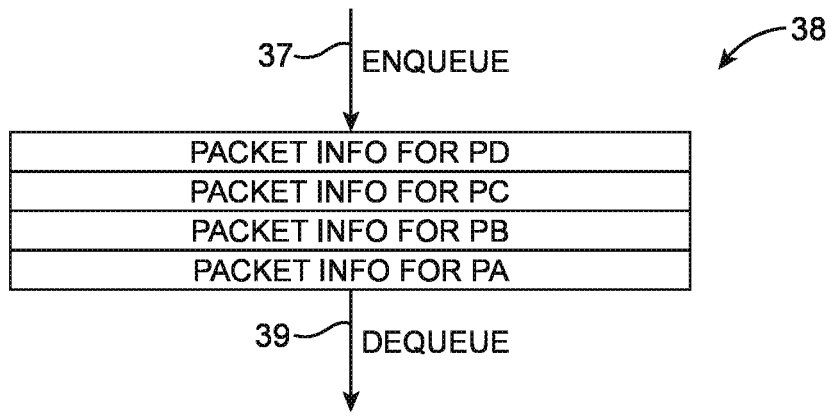
FIG. 3 is a diagram of an illustrative data storage structure configured to store sampled packet information in accordance with some embodiments.

FIG. 3 shows an illustrative configuration of data storage circuitry 38. In the example of FIG. 3, sampled packet information for packet PA may be first to be enqueued via path 37 and first to be dequeued via path 39. Sampled packet information for packet PB may be second to be enqueued via path 37 and second to be dequeued via path 39. Sampled packet information for packet PC may be third to be enqueued via path 37 and third to be dequeued via path 39. Sampled packet information for packet PD may be fourth to be enqueued via path 37 and fourth to be dequeued via path 39.

While FIG. 3 shows an illustrative configuration of data storage circuitry 38 having a single data storage circuit or data storage structure for storing sampled packet information, this is merely illustrative. Data storage circuitry 38 may generally include any number of (e.g., two, three, four, more than four, etc.) data storage circuits for storing sampled packet information.

Figure 4A:
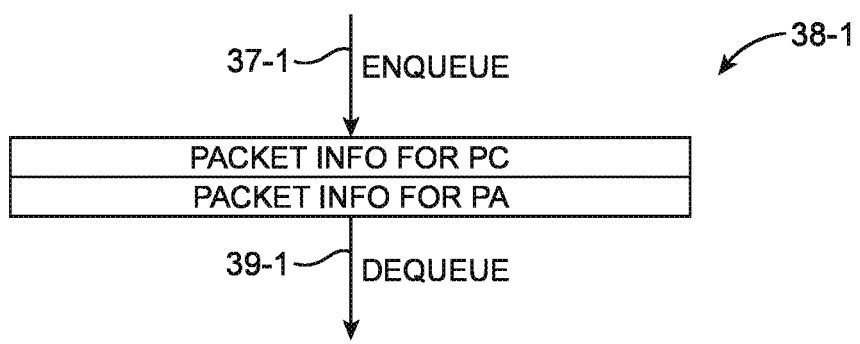
FIGS. 4A and 4B are diagrams of an illustrative pair of data storage structures configured to store sampled packet information in accordance with some embodiments.
Figure 4B:
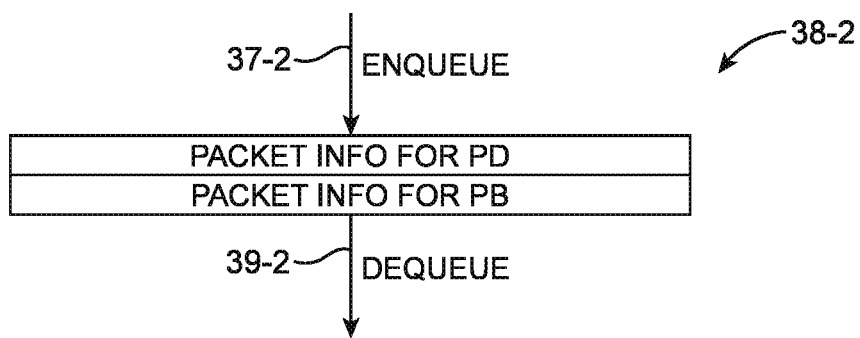

FIGS. 4A and 4B show a pair of data storage circuits for implementing data storage circuitry 38 each configured to store different sampled packet information. Data storage circuits 38-1 and 38-2 may be coupled in parallel between parser 32 and processing engine 34 (FIG. 2). In other words, parser 32 may provide sampled packet information to one of data storage circuits 38-1 and 38-2 via a corresponding one of parallel enqueue paths 37-1 and 37-2, while the stored sampled packet information may be dequeued from data storage circuits 38-1 and 38-2 via corresponding parallel dequeue paths 39-1 and 39-2 to the same or different processing engine(s) 34.

In the example of FIGS. 4A and 4B, data storage circuits 38-1 and 38-2 are shown to store packet information for different sets of transit packets. In particular, data storage circuit 38-1 may store sampled packet information for packets PA and PC, while data storage circuit 38-2 may store sampled packet information for packets PB and PD. However, this storage scheme is merely illustrative. If desired, a first data storage circuit 38-1 may store a first piece of packet information (e.g., source IP address and destination IP address) for all packets PA, PB, PC, and PD, while a second data storage circuit 38-2 stores a second (different) piece of packet information (e.g., timestamp information) for all packets PA, PB, PC, and PD. If desired, sampled packet information may be stored (e.g., split) across multiple data storage circuits in data storage circuitry 38 in any suitable manner.

In general, processing engine 34 may receive sampled packet information from one or both of data storage circuits 38-1 and 38-2 in any suitable manner e.g., depending on how the sampled packet information is split amongst the different data storage circuits, based on the desired type of information (e.g., header information, timestamp information, packet count information, etc.) to send to collector system 12, the types of sampling (e.g., random sampling of all transit packets, information for only a desired subset of transit packets, etc.) to send to collector system 12, and/or based on other sampling considerations. The stored sampled packet information may be dequeued from both data storage circuits 38-1 and 38-2 in parallel, from one data storage circuit after the other data storage circuit is empty, and/or in any desired manner.

Providing multiple data storage circuits in circuitry 38 may provide additional storage capacity and bandwidth to enqueue packet information for more (e.g., all) transit packets and may provide additional customized sampling capabilities based on selectively dequeuing from different subsets of data storage circuits.

Referring back to FIG. 2, the same information accumulation packet (e.g., initially received at input interface 41) may be recirculated by packet processor 16 via a feedback path such as the path coupled to output interface 43 (e.g., an internal interface of processing pipeline 30 or of packet processor 16, an external egress interface of network device 10, etc.). By recirculating the information accumulation packet, the information accumulation packet may continue to accumulate sampled packet information until it is ready to be sent to collector system 12. In other words, with each additional pass through processing pipeline 30, the information accumulation packet may be modified by processing engine 34 to include additional sampled packet information dequeued from packet storage circuitry 38. The recirculation of the information accumulation packet configures the information accumulation packet to form a modifiable temporary data storage for packet processor 16 or generally for device 10 into which additional data can be written (e.g., with processing pipeline 30 providing the writing mechanism with which the additional data can be written into the temporary data storage or generally the memory access mechanism for the temporary data storage).

The path which takes transit packets such as transit packet P1 from input interface 31 to output interface 35 may sometimes be referred to herein as a transit packet processing path. In contrast, the path by which an information accumulation packet is recirculated (e.g., from input interface 41 to output interface 43, from output interface 43 back to input interface 41, etc.) may sometimes be referred to herein as a packet information accumulation path. While shown as two separate paths in the example of FIG. 2, if desired, the transit packet processing path and the packet information accumulation path may share path portions and/or input-output interfaces of processing pipeline 30.

Processing pipeline 30 may further include transmit logic 40 (sometimes referred to as logic circuitry 40) coupled along the packet information accumulation path that enforces one or more criteria and is configured to determine whether or not the information accumulation packet should be transmitted to collector system 12. If one or more criteria are met, transmit logic 40 may select (e.g., via a selector) a corresponding output interface such as output interface 45 to transmit the information accumulation packet to collector system 12 as packet P3. If desired, information accumulation packet P3 may further be edited downstream from processing pipeline 30 before being output by packet processor 16 to collector system 12. If one or more criteria are not met, transmit logic 40 may output the information accumulation packet via interface 43 for further recirculation across processing pipeline 30.

The one or more criteria for transmitting the information accumulation packet to collector 12 may include whether a packet size parameter exceeds a threshold level, whether a number of sampled packets accumulated in the packet exceeds a threshold level, and/or include criteria based on other packets properties of the information accumulation packet, may include an expiry of a timer (e.g., indicative of or based on an elapsed time since sending a prior sampling information accumulation packet toward collector system 12, indicative of an elapsed time since a first packet information was sampled and/or inserted into the current information accumulation packet, etc.), and/or may include other desired criteria.

As shown in FIG. 2, packet generator 50 may provide an initial version of the information accumulation packets (e.g., packet $P3_0$) into which the sampled packet information from data storage structure 38 can be inserted by processing engine 34. The initial version of the information accumulation packets may be provided via path 51 to input interface 41. Packet generator 50 may provide the initial version of the information accumulation packets at set time intervals, in response to a previous information accumulation packet being sent to collector system 12 or other criteria, or in any other desired manner.

Packet generator 50 may be implemented on packet processor 16. However, if desired, control plane processor 14 or other processors on network device 10 may provide the initial version of the information accumulation packets to packet processor 16 (e.g., to interface 41 of processing pipeline 30) and thereby implement packet generator 50.

Figure 5A:
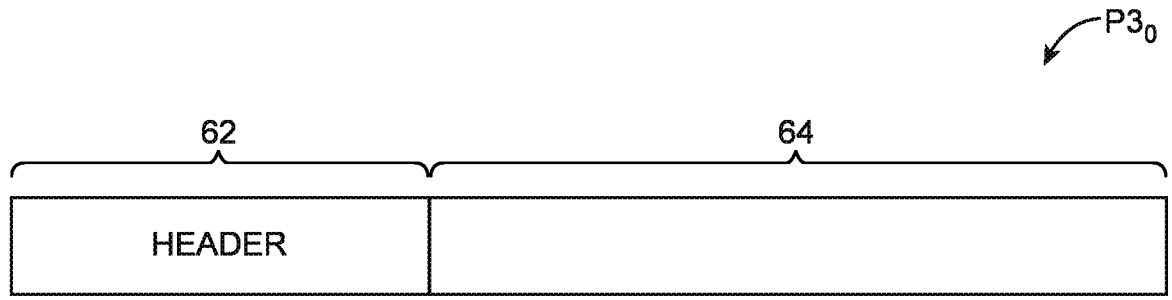
FIGS. 5A-5C are diagrams of illustrative states of a sampled packet information accumulation packet in accordance with some embodiments.
Figure 5B:
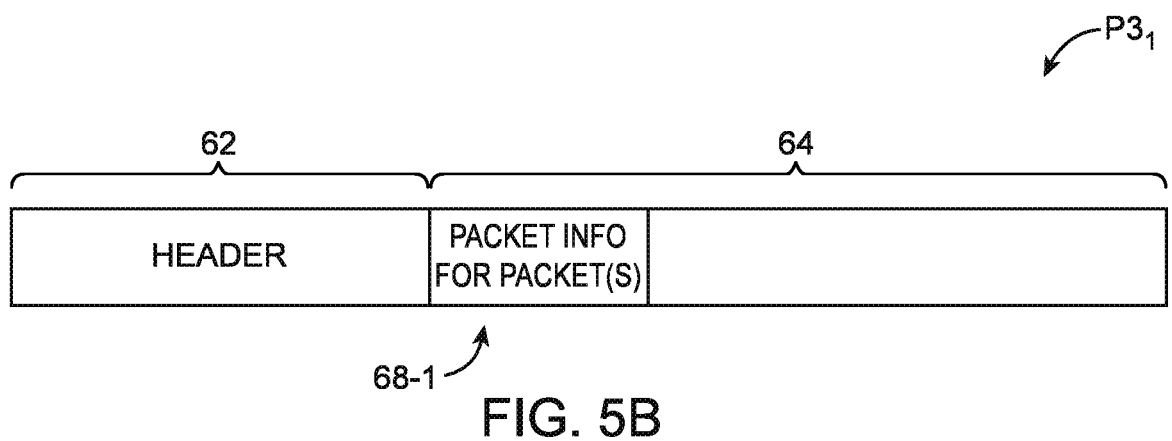
Figure 5C:
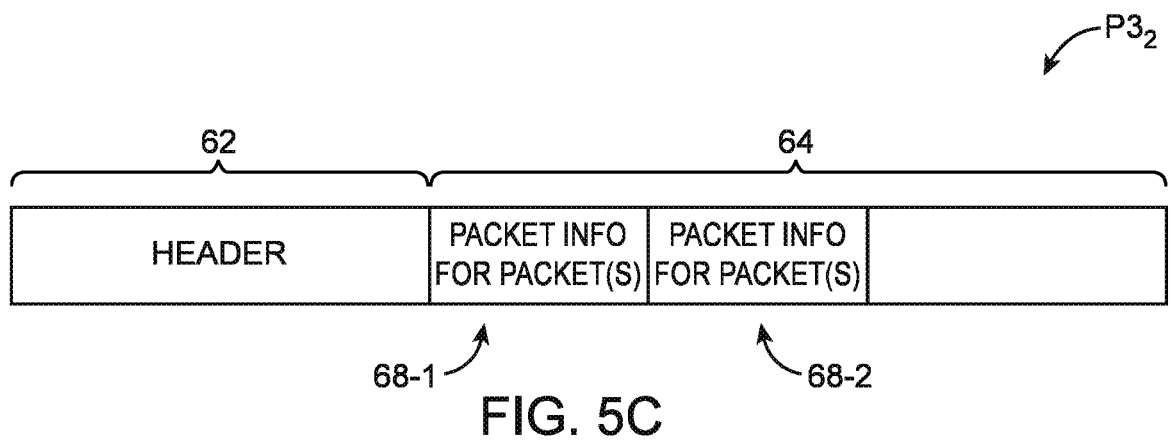

FIGS. 5A-5C show illustrative versions or states of the same information accumulation packet P3 as it passes through processing pipeline 30 multiple times. In particular, FIG. 5A shows an illustrative initial version of information accumulation packet $P3_0$ (e.g., as provided by packet generator 50 in FIG. 2). Packet $P3_0$ may include a header 62 containing header information. As an example, the header information may identify collector system 12 as a packet destination (e.g., include address information of collector system 12), may identify network device 10 as a packet source (e.g., include address information of network device 10), may identify itself as containing sampled packet information, and/or may include any other suitable header information. Packet $P3_0$ may include a data payload 64 that is empty or at least contains sufficient space for a desired amount of sampled packet information to be inserted. Processing engine 34 (FIG. 2) may insert sampled packet information into payload 64 as information accumulation packet $P3_0$ passes through processing pipeline 30.

FIG. 5B shows an illustrative information accumulation packet $P3_1$ after a first pass through processing pipeline 30

(e.g., after a single pass of information accumulation packet $P3_0$ through processing pipeline 30). As shown in FIG. 5B, packet $P3_1$ may include packet information 68-1 for one or more sampled packets inserted into payload 64. In particular, packet information 68-1 may be sampled packet information dequeued from data storage circuitry 38 and inserted into packet $P3_1$ by processing engine 34.

Packet information 68-1 may include some or all of the sampled packet information stored at data storage circuitry 38 at the time when information accumulation packet $P3_0$ passes through processing pipeline 30. In particular, if desired, all the stored contents (e.g., sampled packet information) at data storage circuitry 38 may be emptied (dequeued) and inserted into information accumulation packet $P3_0$ to produce information accumulation packet $P3_1$. Using the stored content of data storage circuitry 38 in FIG. 3 as an example, processing engine 34 may insert the sampled packet information for packets PA, PB, PC, and PD into information accumulation packet $P3_0$ (as packet information 68-1) to produce information accumulation packet $P3_1$.

In other configurations, all the stored contents (e.g., sampled packet information) at a single data storage circuit may be emptied (dequeued) and inserted into information accumulation packet $P3_0$ to produce information accumulation packet $P3_1$. Using the stored content of data storage circuit 38-1 in FIG. 4A as an example, processing engine 34 may insert the sampled packet information for packets PA and PC into information accumulation packet $P3_0$ (as packet information 68-1) to produce information accumulation packet $P3_1$.

In general, any desired set or amount of sampled packet information may be inserted into information accumulation packet $P3_0$ (as packet information 68-1) to produce information accumulation packet $P3_1$.

FIG. 5C shows an illustrative information accumulation packet $P3_2$ after a second pass through processing pipeline 30 (e.g., after transmit logic 40 outputs information accumulation packet $P3_1$ via interface 43 for further circulation and information accumulation packet $P3_1$ passes through processing pipeline 30). As shown in FIG. 5C, packet $P3_2$ may include packet information 68-2 for one or more additional sampled packets inserted into payload 64, in addition to the previous inserted packet information 68-1. In particular, packet information 68-2 may be sampled packet information dequeued from data storage circuitry 38 and inserted into packet $P3_2$ by the processing engine of processing pipeline 30.

Packet information 68-2 may include some or all of the sampled packet information stored at data storage circuitry 38 at the time when information accumulation packet $P3_1$ passes through processing pipeline 30. In particular, if desired, all the newly stored sampled packet information at data storage circuitry 38 (e.g., stored after outputting information accumulation packet $P3_1$) may be emptied (dequeued) and inserted into information accumulation packet $P3_1$ to produce information accumulation packet $P3_2$. In other configurations, all the stored contents (e.g., sampled packet information) at a different single data storage circuit may be emptied (dequeued) and inserted into information accumulation packet $P3_1$ to produce information accumulation packet $P3_2$. In general, any desired set or amount of sampled packet information may be inserted into information accumulation packet $P3_1$ (as packet information 68-2) to produce information accumulation packet $P3_2$.

In scenarios where information accumulation packet $P3_2$ meets the one or more criteria for transmission to collector system 12 and/or a criterion associated with an expiry of a timer is met, information accumulation packet $P3_2$ may be transmitted by processing pipeline 30 without another pass through processing pipeline 30. Otherwise, additional sampled packet information may continue to be inserted into payload 64 with each pass through processing pipeline 30 until the one or more criteria are met.

Figure 6:
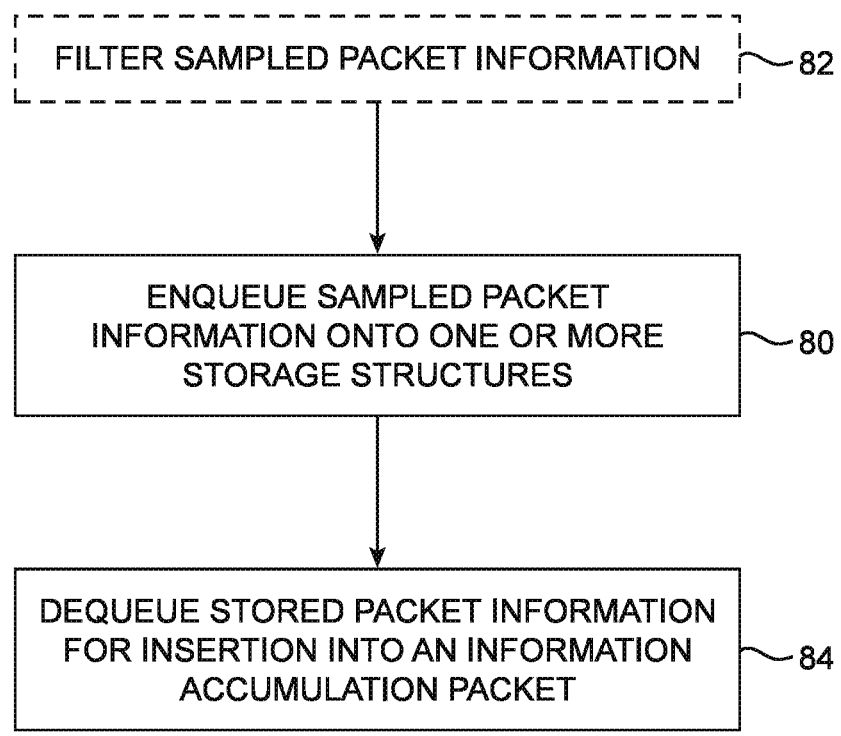
FIG. 6 is a flowchart of illustrative operations for handling sampled packet information at a packet processor in accordance with some embodiments.
Figure 7:
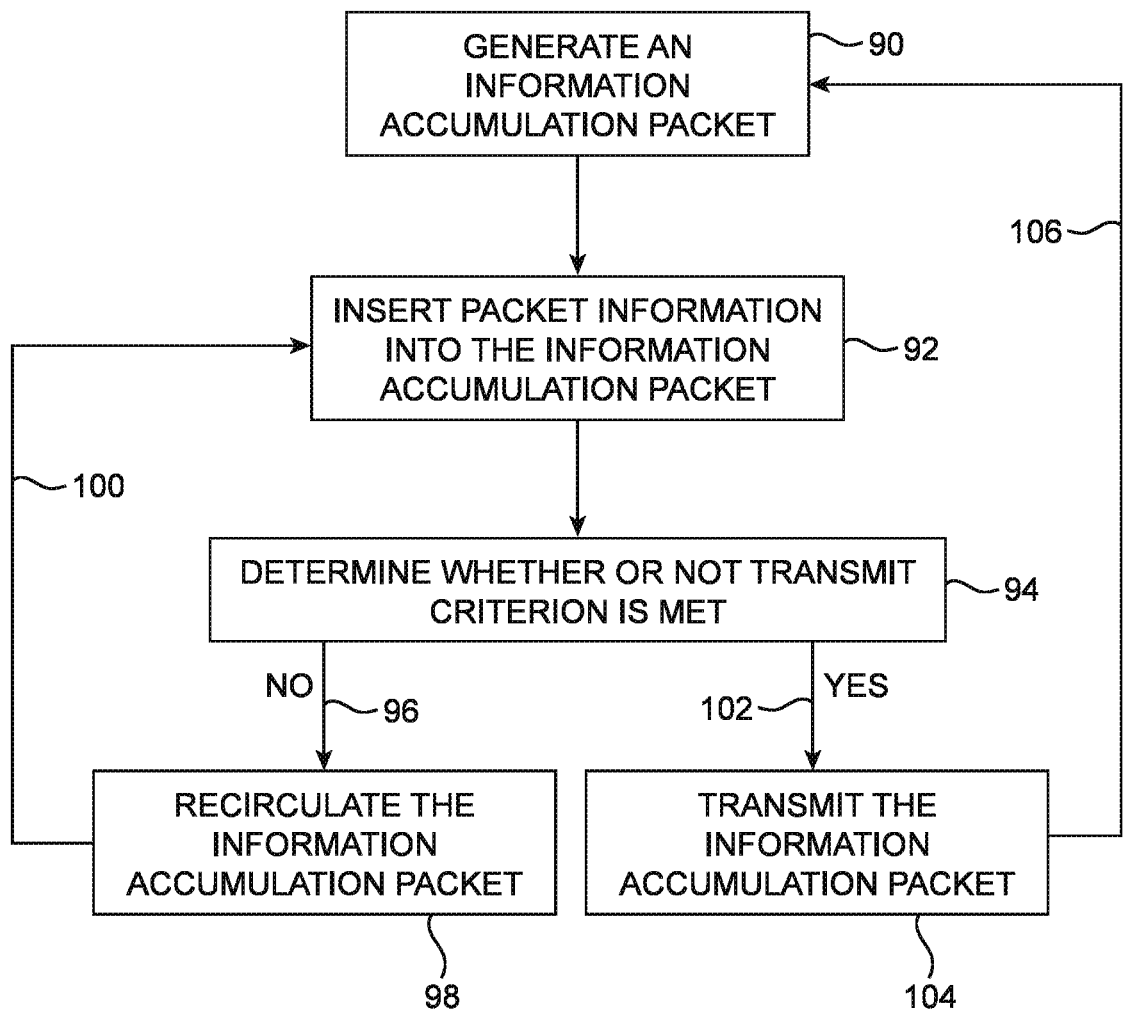
FIG. 7 is a flowchart of illustrative operations for transmitting a sampled packet information accumulation packet in accordance with some embodiments.

FIGS. 6 and 7 are illustrative flowcharts of illustrative packet sampling operations performed using a packet processor such as packet processor 16 in FIGS. 1 and 2 and/or generally using processing circuitry 11 in FIG. 1 (e.g., by executing software instructions stored on memory circuitry 13).

In particular, FIG. 6 illustrates operations associated with handling of sampled packet information for different transit packets. As shown in FIG. 6, at block 80, data storage circuitry such as data storage circuitry 38 for one or more processing pipelines 30 in packet processor 16 in FIG. 2 may receive and store (e.g., enqueue) sampled packet information. The sampled packet information may be organized and distributed across one or more data storage circuits or structures in data storage circuitry 38 in any suitable manner (e.g., as described in connection with FIGS. 3, 4A, and 4B). In other words, at block 80, the data storage circuitry may accumulate and store sampled packet information for transit packets (e.g., even after at least some of these transit packets have been forwarded by and have left the processing pipeline, the packet processor, or even the network device).

If desired, at block 82, a filter (e.g., a filtering circuit) such as filter 36 implemented in packet processor 16 in FIG. 2 may filter the sampled packet information and only pass the (desired) portion of the sampled packet information to the one or more data storage structures for storage. If desired, filter may implement a pseudo-random sampling of transit packets (e.g., by filtering the sampled packet information in a pseudo-random manner) or may implement a deterministic or patterned sampling of transit packets (e.g., only sampled packet information for a desired set or flow of packets are stored).

At block 84, data storage circuitry such as data storage circuitry 38 may dequeue one or more sampled packet information entries (each entry containing sampled packet information for a different transit packet) to a packet processing engine such as processing engine 34 in FIG. 2. As a first example, a single data storage circuit in circuitry 38 may dequeue entries one at a time to the processing engine. As a second example, multiple data storage circuits in circuitry 38 may dequeue multiple entries (e.g., with each data storage circuit dequeuing a corresponding entry) to the processing engine. In scenarios in which each data storage circuit contains different types of sampled information (e.g., information for different header fields, information for different packet statistics, timestamp information, etc.) for the same transit packet(s), the dequeuing of entries may occur in coordination (e.g., in at least a partially concurrent manner or a sequential manner) such that the different sampled information for the same transit packets can be proximally located in the information accumulation packet. In scenarios in which each data storage circuit contains sampled information for different transit packets, the dequeuing of entries may occur via parallel paths coupled to the processing engine with any suitable timing. The processing engine may insert the dequeued packet information into an information accumulation packet that is ultimately sent to a packet collector.

FIG. 7 illustrates operations associated with generation and transmission of a sampled packet information accumulation packet. As shown in FIG. 7, at block 90, a packet generator such as packet generator 50 in FIG. 2 (e.g., implemented using packet processor 16, control plane processor 14, or another portion of processing circuitry 11) may generate an initial version of an information accumulation packet (e.g., packet $P3_0$ in FIG. 5A). This initially generated information accumulation packet may include header information but lack a data payload. A processing pipeline in a packet processor (e.g., processing pipeline 30 in packet processor 16 in FIG. 2) may receive the initial version of the information accumulation packet at an input interface of the processing pipeline.

At block 92, a packet processing engine such as processing engine 34 (FIG. 2) in the processing pipeline may insert sampled packet information into the data payload of the information accumulation packet (e.g., producing packet $P3_1$ in FIG. 5B). The sampled packet information may be dequeued from one or more data storage circuits (e.g., storage circuitry 38) configured to accumulate sampled packet information.

At block 94, logic circuitry such as transmit logic circuitry 40 (FIG. 2) in the processing pipeline may determine whether one or more criteria for transmitting the information accumulation packet to the collector system has been met. Depending on this determination, transmit logic circuitry 40 may forward the information accumulation packet to different output interfaces of the processing pipeline.

If the one or more transmission criteria has not been met, processing may proceed via path 96 to block 98. At block 98, the transmit logic circuitry may transmit the information accumulation packet via a first output interface that recirculates the information accumulation packet (e.g., via a sampled packet information accumulation path coupled to an input interface of the processing pipeline).

Accordingly, following block 98, processing may proceed via path 100 back to block 92. At this second instance of block 92, the processing engine in the processing pipeline may insert additional sampled packet information into the data payload of the information accumulation packet (e.g., producing packet $P3_2$ in FIG. 5C). Based on multiple iterations of blocks 92, 94, and 98, sampled packet information may be sequentially and cumulatively inserted into the same information accumulation packet by the processing engine after corresponding passes through the processing pipeline.

If desired, after processing proceeds from block 98 via path 100 back to block 92, the processing engine may skip the processing of blocks 92 and/or 94. As an example, this operating condition may occur when the data storage circuits (e.g., storage circuitry 38) contains an amount of packet information (e.g., contains no packet information, contains an amount of packet information below a threshold level, etc.) insufficient for insertion into the information accumulation packet. While this operating condition persists, the information accumulation packet may continually recirculate without the insertion of additional information. In other words, the processing pipeline (e.g., the network device) may effectively use the information accumulation packet as a storage element for sampled packet information as it recirculates and polls the processing pipeline to see if the storage element should be modified (e.g., with the insertion of additional sampled packet information).

If desired, the recirculation of the information accumulation packet at block 98 may be delayed by a pre-determined amount of time or may be delayed by a variable amount of time based on one or more criteria being met. As examples, the one or more criteria may include one or more criteria indicative of the arrival of new packets for sampling (e.g., generation of additional sampled packet information from the newly arrived packets triggers the recirculation of the information accumulation packet at block 98), one or more criteria indicative of the level of stored sampled packet information ready for insertion into an information accumulation packet exceeding a threshold level (e.g., an amount of sampled packet information stored on device 10 triggers the recirculation of the information accumulation packet at block 98), and/or generally one or more criteria indicative of condition(s) that necessitate recirculating the information accumulation packet. If desired, while waiting to be recirculated, the information accumulation packet may be held internally at device 10 (e.g., within the processing pipeline, at a portion of memory circuitry, etc.) or outside of device 10 (e.g., at external memory circuitry). If desired, adjustable delay elements (e.g., to optionally introduce an adjustable delay) in the recirculation path may provide the desired delay.

In a final pass of the information accumulation packet through the processing pipeline, the transmit logic circuitry may determine (at block 94) that one or more transmit criteria for transmission to the collector system have been met. Accordingly, processing may proceed via path 102 to block 104. At block 104, the transmit logic circuitry may transmit the information accumulation packet via a second output interface that transmits the information accumulation packet toward the collector system (e.g., via an egress interface of the packet processor). Following block 104, processing may proceed via path 106 back to block 90 such that a new information accumulation packet can be generated to collect stored sampled packet information at the packet processor. Configured in this manner, at least one information accumulation packet can continually circulate through the processing pipeline to gather sampled packet information.

If desired, the generation of the new information accumulation packet at block 90, after proceeding via path 106, may be delayed by a pre-determined amount of time or may be delayed by a variable amount of time based on one or more criteria being met. As examples, the one or more criteria may include one or more criteria indicative of the arrival of new packets for sampling (e.g., generation of additional sampled packet information from the newly arrived packets triggers the generation of a new information accumulation packet at block 90), one or more criteria indicative of the level of stored sampled packet information ready for insertion into an information accumulation packet exceeding a threshold level (e.g., an amount of sampled packet information stored on device 10 triggers the generation of a new information accumulation packet at block 90), and/or generally one or more criteria indicative of condition(s) that necessitate generating a new information accumulation packet after a previous information accumulation packet has been transmitted (e.g., to a collector).

The methods and operations described above in connection with FIGS. 1-7 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processing circuitry 11 such as processors 14 and 16 of FIG. 1, one or more processing pipelines 30 having processing engines 34 of FIG. 2, etc.).

The foregoing is merely illustrative and various modifications can be made to the described embodiments. The foregoing embodiments may be implemented individually or in any combination.

What is claimed is:

1. A network device comprising:
a packet processing pipeline having:
a parser configured to parse packet information in a transit packet received at an input interface of the network device, wherein the parsed packet information is used to perform a processing operation on the transit packet;
packet sampling information storage circuitry configured to store sampled packet information obtained based on the parsed packet information from the parser; and
a processing engine configured to:
modify a payload of a sampling information accumulation packet to include the sampled packet information for the transit packet;
output the sampling information accumulation packet;
receive the output sampling information accumulation packet containing the sampled packet information for the transit packet in the payload; and
modify the payload of the received sampling information accumulation packet to include additional sampled packet information for one or more additional transit packets in addition to the sampled packet information for the transit packet.

2. The network device defined in claim 1, wherein the packet processing pipeline is configured to output the transit packet and wherein the sampling information accumulation packet containing the sampled packet information for the transit packet in the payload is output from the packet processing pipeline prior to being received by the processing engine.

3. The network device defined in claim 1, wherein the packet sampling information storage circuitry comprises a first-in-first-out (FIFO) circuit.

4. The network device defined in claim 3, wherein the sampled packet information for the transit packet comprises header information of the transit packet.

5. The network device defined in claim 3, wherein the sampled packet information for the transit packet comprises timestamp information associated with the transit packet.

6. The network device defined in claim 3, wherein the sampled packet information for the transit packet comprises packet count information associated with a network flow to which the transit packet belongs.

7. The network device defined in claim 1, wherein the packet sampling information storage circuitry comprises first and second data storage structures configured to store first and second sets of transit packets, respectively.

8. The network device defined in claim 1, wherein the packet sampling information storage circuitry comprises first and second data storage structures configured to store first and second types of sampled packet information, respectively.

9. The network device defined in claim 1, wherein the sampling information accumulation packet is recirculated across the packet processing pipeline via a first output interface of the packet processing pipeline and is transmitted toward a collector system via a second output interface of the packet processing pipeline.

10. The network device defined in claim 9, wherein the packet processing pipeline includes transmit logic circuitry configured to determine whether the sampling information accumulation packet is to be recirculated across the packet processing pipeline via the first output interface of the packet processing pipeline or is to be transmitted toward the collector system via the second output interface of the packet processing pipeline.

11. The network device defined in claim 1 further comprising:
a packet generator configured to provide an initial version of the packet information accumulation packet.

12. The network device defined in claim 1, wherein the packet sampling information storage circuitry is configured to store the additional sampled packet information for the one or more additional transit packets after the processing engine output the sampling information accumulation packet.

13. A method for packet sampling, the method comprising:
receiving, at a packet processor of a network device, a plurality of transit packets;
forwarding, by the packet processor, the plurality of transit packets from one or more ingress interfaces to one or more egress interfaces;
storing, at the packet processor, packet information associated with the plurality of transit packets;
inserting the packet information into a sampling information accumulation packet as the sampling information accumulation packet passes across the packet processor, wherein, after a first pass of the sampling information accumulation packet across the packet processor, a payload of the sampling information accumulation packet is inserted with a first portion of the packet information and wherein, after a second pass of the sampling information accumulation packet across the packet processor, the payload of the sampling information accumulation packet is inserted with a second portion of the packet information; and
based on a criterion, outputting the sampling information accumulation packet that is destined for a collector system.

14. The method defined in claim 13 further comprising:
enqueuing the packet information onto one or more data storage structures in the packet processor.

15. The method defined in claim 13, wherein the criterion is based on a number of transit packets for which packet information has been inserted into the sampling information accumulation packet.

16. The method defined in claim 13, wherein the criterion is based on a size of the sampling information accumulation packet.

17. The method defined in claim 13, wherein the criterion is based on an elapsed time since sending a prior sampling information accumulation packet.

18. A method for accumulating packet sampling information, the method comprising:
receiving, at a packet processor of a network device, a plurality of transit packets;
enqueuing packet information for each transit packet in the plurality of transit packets onto one or more data storage structures in the network device;

dequeuing the packet information for each transit packet in the plurality of transit packets from the one or more data storage structures;

forwarding, at a processing pipeline, the plurality of transit packets;

inserting, at the processing pipeline, the dequeued packet information into a payload of a sampling information accumulation packet; and recirculating the sampling information accumulation packet across the processing pipeline to insert additional packet information for one or more additional transit packets into the payload of the sampling information accumulation packet.

19. The method defined in claim 18 wherein the payload of the sampling information accumulation packet has a first size prior to the recirculation of the sampling information accumulation packet and has a second size after the recirculation of the sampling information accumulation packet, the second size being greater than the first size.

20. The method defined in claim 18, wherein the packet information comprises timestamp information associated with each transit packet in the plurality of transit packets.

* * * * *